(12) United States Patent
Moon et al.

(10) Patent No.: US 11,214,221 B2
(45) Date of Patent: Jan. 4, 2022

(54) HARD COVER FOR SIDE AIRBAG

(71) Applicant: HYUNDAI MOBIS CO., LTD., Seoul (KR)

(72) Inventors: Geon Woong Moon, Yongin-si (KR); Ye Ri Hong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 172 days.

(21) Appl. No.: 16/533,483

(22) Filed: Aug. 6, 2019

(65) Prior Publication Data
US 2020/0047707 A1    Feb. 13, 2020

(30) Foreign Application Priority Data

Aug. 7, 2018 (KR) .................. 10-2018-0091779

(51) Int. Cl.
*B60R 21/231* (2011.01)
*B60R 21/215* (2011.01)
B60R 21/207 (2006.01)

(52) U.S. Cl.
CPC ...... *B60R 21/23138* (2013.01); *B60R 21/215* (2013.01); *B60R 21/207* (2013.01); *B60R 2021/21512* (2013.01); *B60R 2021/23146* (2013.01)

(58) Field of Classification Search
CPC ............ B60R 21/23138; B60R 21/215; B60R 2021/23146; B60R 21/207; B60R 2021/21512
See application file for complete search history.

(56) References Cited

U.S. PATENT DOCUMENTS

| | | | | |
|---|---|---|---|---|
| 5,906,395 A * | 5/1999 | Isaji | ...................... | B60R 21/237 280/743.1 |
| 5,988,674 A * | 11/1999 | Kimura | .................. | B60R 21/207 280/728.3 |
| 6,196,577 B1 * | 3/2001 | Aoki | ...................... | B60R 21/207 280/730.1 |
| 6,386,577 B1 * | 5/2002 | Kan | ....................... | B60R 21/207 280/728.1 |
| 6,422,590 B1 * | 7/2002 | Umezawa | ............. | B60R 21/207 280/728.2 |
| 6,457,741 B2 * | 10/2002 | Seki | ....................... | B60R 21/207 280/730.2 |
| 6,612,610 B1 * | 9/2003 | Aoki | ...................... | B60R 21/201 280/730.2 |
| 7,841,620 B2 * | 11/2010 | Kai | ....................... | B60R 21/207 280/728.3 |

* cited by examiner

*Primary Examiner* — Paul N Dickson
*Assistant Examiner* — Joselynn Y Sliteris
(74) *Attorney, Agent, or Firm* — DLA Piper LLP (US)

(57) ABSTRACT

Disclosed herein is a hard cover for a side airbag. The hard cover includes a housing accommodating a cushion, a cover unit covering an opening of the housing and having a cut part formed to be cut when the cushion is deployed, a hinge connecting the cover unit and a rear of the housing, a first restraint unit provided on a front of the housing, a first hook unit provided on a front of the cover unit to be caught and restrained by the first restraint unit, a second restraint unit provided on each of upper and lower sides of the housing, and a second hook unit provided on each of upper and lower sides of the cover unit to be caught and restrained by the second restraint unit and separated from the second restraint unit when the cushion is deployed.

11 Claims, 13 Drawing Sheets

HARD COVER FOR SIDE AIRBAG

CROSS-REFERENCES TO RELATED APPLICATIONS

The present application claims priority to Korean application number 10-2018-0091779, filed on Aug. 7, 2018 which is incorporated by reference in its entirety.

BACKGROUND OF THE INVENTION

The present invention relates to a hard cover for a side airbag, and more particularly, to a hard cover for a side airbag, which is installed not to protrude from a side of a slim seat and is capable of preventing a housing and a cover unit from being damaged when a cushion is deployed.

Generally, a vehicle is equipped with a seat to allow a passenger to sit thereon. A side airbag is provided on a side of the seat. A pad member such as a sponge is provided on the side of the seat. Such a pad member is provided on the side of the seat to avoid a soft cover for the side airbag.

Recently, a slim seat having no pad member on the side of the seat is applied. In the case of applying the slim seat, the soft cover is provided on the side of the slim seat. An airbag cushion is folded and provided in the soft cover.

However, conventionally, as the folded airbag cushion is slightly inflated, the soft cover is deformed to be thicker. Thus, the soft cover may protrude convexly from the side of the slim seat. A hard cover that is not deformed by the folded airbag cushion needs to be applied in order to prevent the side airbag from protruding convexly from the side of the slim seat.

SUMMARY OF THE INVENTION

Embodiments of the present invention are directed to a hard cover for a side airbag, which is installed not to protrude from a side of a slim seat and is capable of preventing a housing and a cover unit from being damaged when a cushion is deployed.

In one embodiment, a hard cover for a side airbag may include a housing configured to accommodate a cushion therein; a cover unit configured to cover an opening of the housing, and having a cut part formed to be cut when the cushion is deployed; a hinge configured to connect the cover unit and a rear of the housing so that the cover unit is opened while being rotated; a first restraint unit provided on a front of the housing; a first hook unit provided on a front of the cover unit to be caught and restrained by the first restraint unit; a second restraint unit provided on each of upper and lower sides of the housing; and a second hook unit provided on each of upper and lower sides of the cover unit to be caught and restrained by the second restraint unit, and separated from the second restraint unit as the cover unit is pressed when the cushion is deployed.

The cut part may include at least one cutoff line formed on the front of the cover unit.

The cutoff line may be formed on the front of the cover unit in a longitudinal direction of the cover unit.

The first restraint unit may include a first restraint rib disposed on the front of the housing in the longitudinal direction thereof and having a plurality of first restraint grooves formed to allow the first hook unit to be caught and restrained.

The first hook unit may include a plurality of first hooks that are provided on the front of the cover unit to be inserted into the first restraint grooves, respectively.

The second restraint unit may include a second restraint rib disposed on each of the upper and lower sides of the housing, and having a second restraint groove formed to allow the second hook unit to be caught and restrained; and a second notch formed in the second restraint rib to be broken by a pressing force of the second hook unit when the cushion is deployed.

The cover unit may include at least one cover slit formed to allow the cover unit to be broken by an inflation pressure of the cushion.

The cover slit may be formed in a cover corner of the cover unit.

The cover slit may be formed in each of the plurality of cover corners.

The housing may include at least one housing slit formed to allow the housing to be broken by the inflation pressure of the cushion.

The housing slit may be formed in a housing corner of the housing.

The housing slit may be formed in each of the plurality of housing corners.

According to the present invention, a second hook unit is separated from a second restraint unit when a cushion is deployed, so that loads applied to a cover unit and a housing can be reduced.

Furthermore, according to the present invention, a housing slit is formed in a housing corner, so that the housing corner can be easily broken.

Furthermore, according to the present invention, a cover slit is formed in a cover corner, so that the cover corner can be easily broken.

DESCRIPTION OF SPECIFIC EMBODIMENTS

Hereinafter, an embodiment of a hard cover for a side airbag in accordance with an embodiment of the present invention will be described with reference to the accompanying drawings. It should be noted that in the description of the hard cover for the side airbag, the drawings are not to precise scale and may be exaggerated in thickness of lines or sizes of components for descriptive convenience and clarity only. Furthermore, the terms as used herein are defined by taking functions in the invention into account and can be changed according to the custom or intention of users or operators. Therefore, definition of the terms should be made according to the overall disclosures set forth herein.

Figure 1:
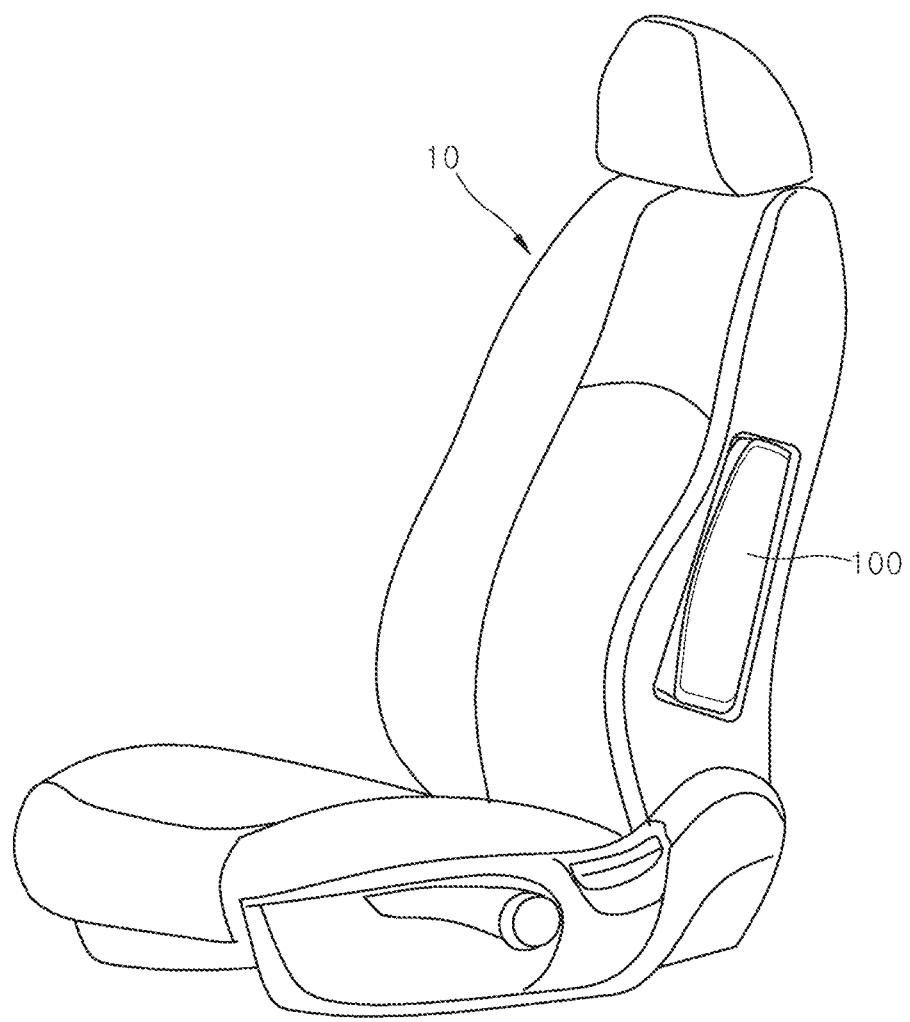
FIG. 1 is a perspective view illustrating a state in which a hard cover for a side airbag in accordance with an embodiment of the present invention is provided on a side of a slim seat.
Figure 2:
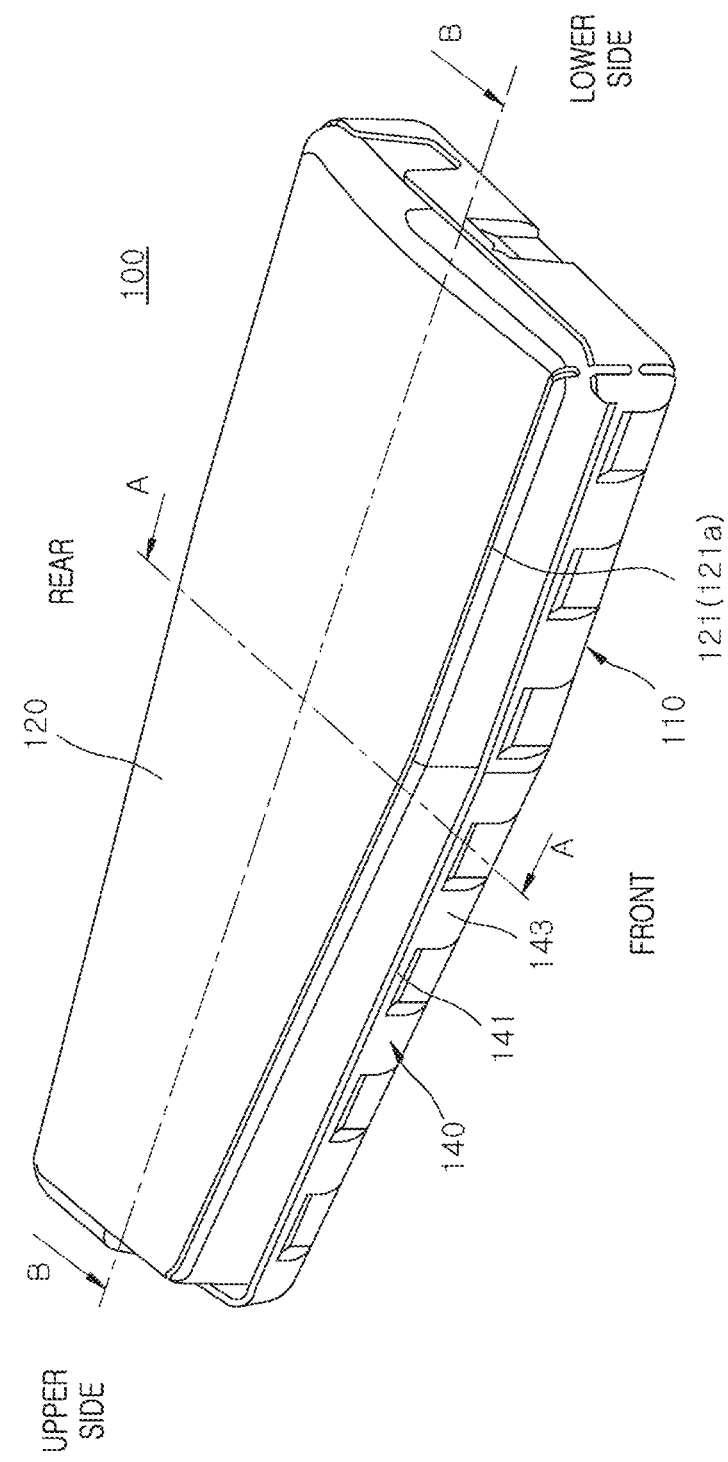
FIG. 2 is a perspective view illustrating the hard cover for the side airbag in accordance with the embodiment of the present invention.
Figure 3:
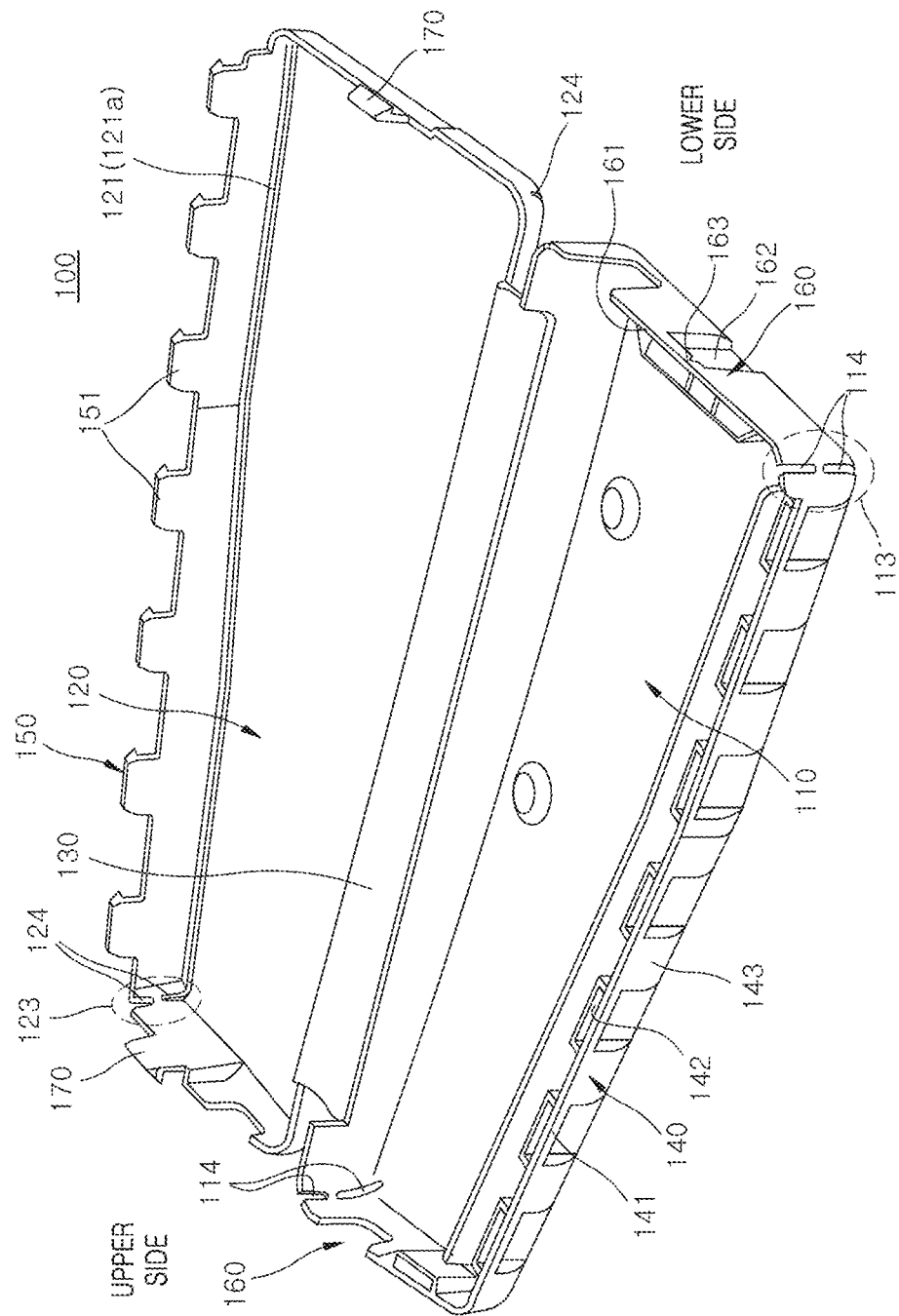
FIG. 3 is a perspective view illustrating a state in which the hard cover for the side airbag in accordance with the embodiment of the present invention is opened.
Figure 4:
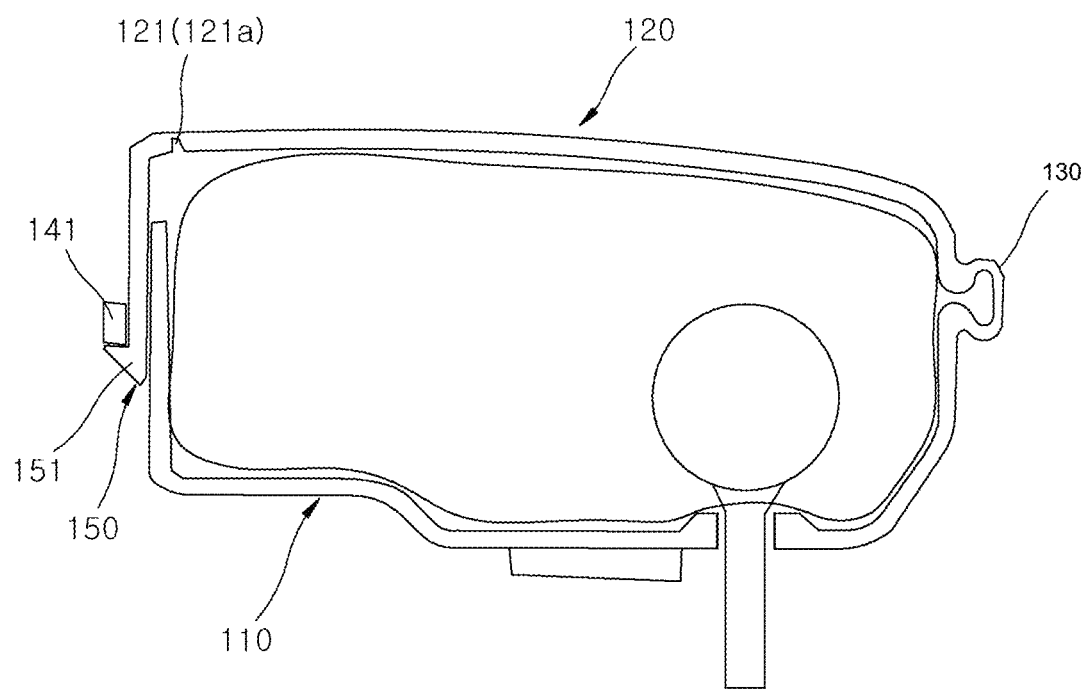
FIG. 4 is a sectional view taken along line A-A that is a width direction of the hard cover for the side airbag in accordance with the embodiment of the present invention.
Figure 5:
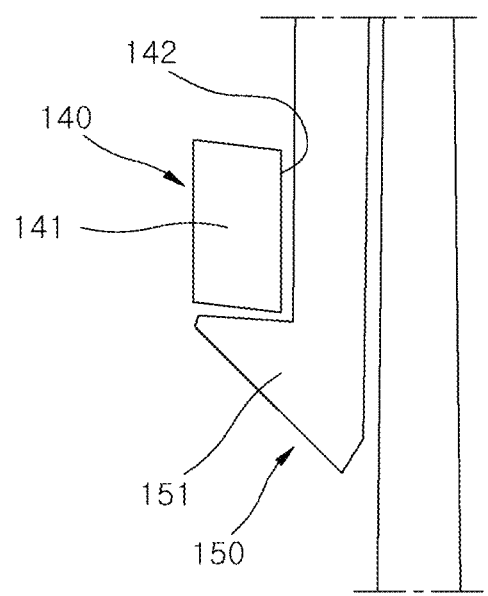
FIG. 5 is an enlarged sectional view illustrating a state in which a first hook unit is restrained by a first restraint unit in the hard cover for the side airbag in accordance with the embodiment of the present invention.
Figure 6A:
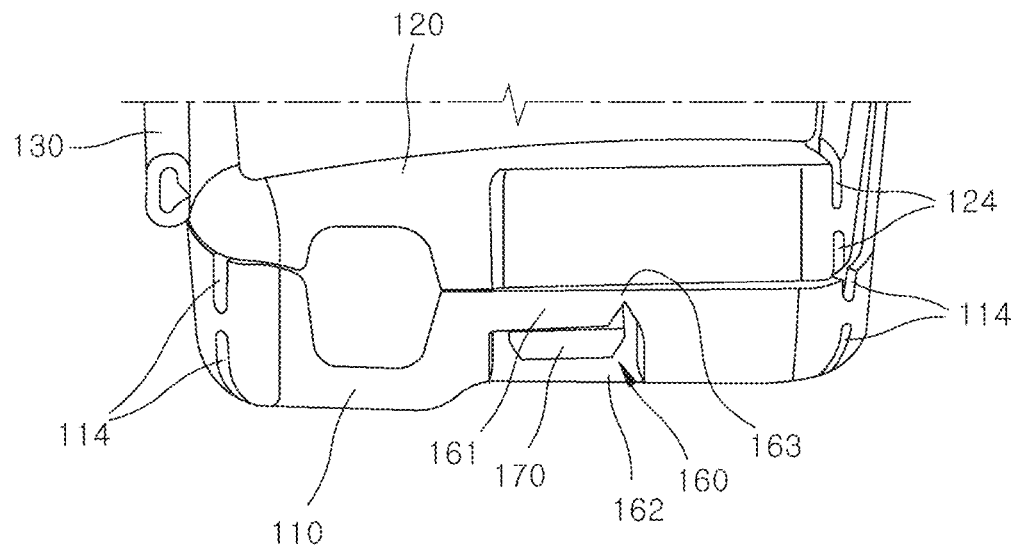
FIG. 6A is a view illustrating a coupled state of a second hook unit and a second restraint unit formed on an upper side of a housing in the hard cover for the side airbag in accordance with the embodiment of the present invention.
Figure 6B:
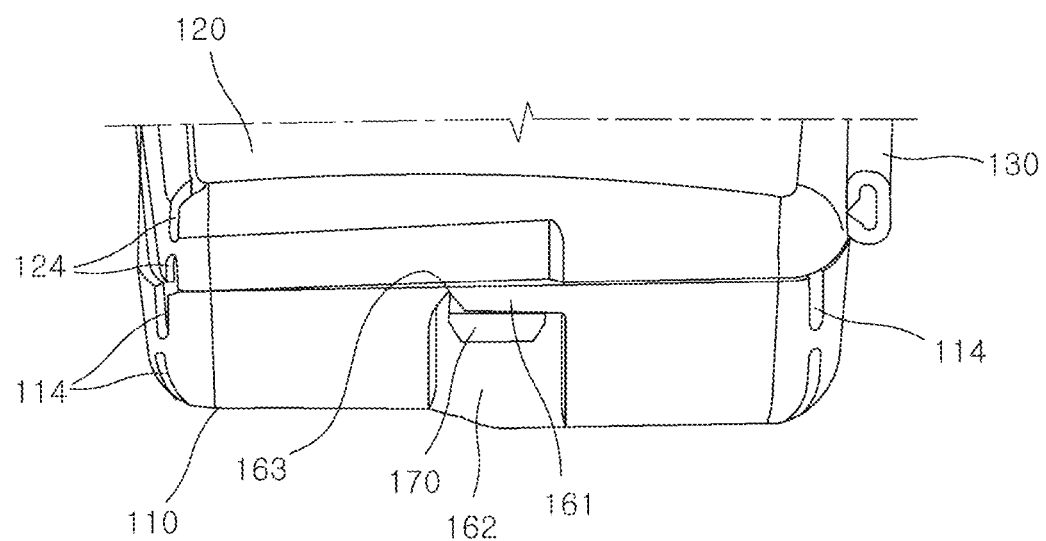
FIG. 6B is a view illustrating a coupled state of the second hook unit and the second restraint unit formed on a lower side of the housing in the hard cover for the side airbag in accordance with the embodiment of the present invention.
Figure 7A:
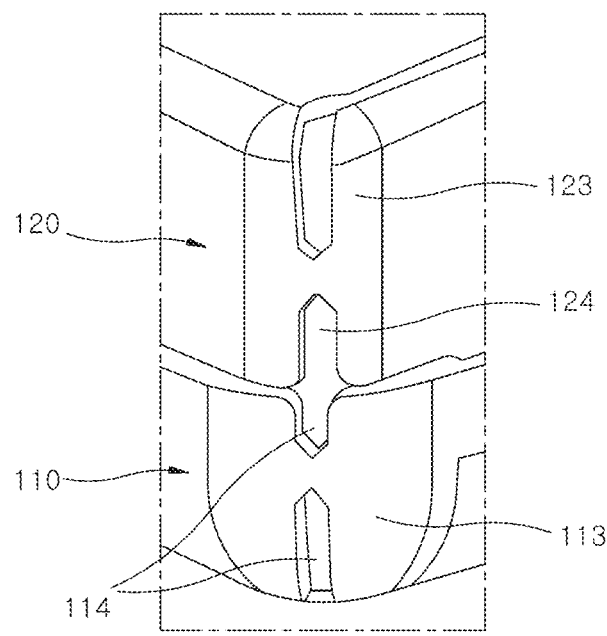
FIG. 7A is a view illustrating a left housing corner on the lower side of the housing in the hard cover for the side airbag in accordance with the embodiment of the present invention.
Figure 7B:
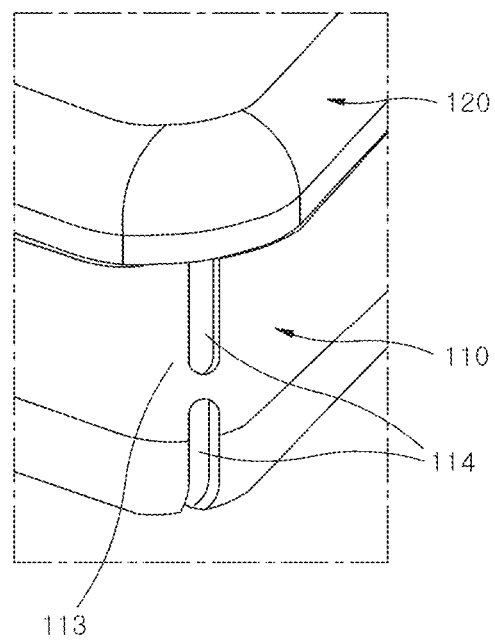
FIG. 7B is a view illustrating a right housing corner on the lower side of the housing in the hard cover for the side airbag in accordance with the embodiment of the present invention.
Figure 7C:
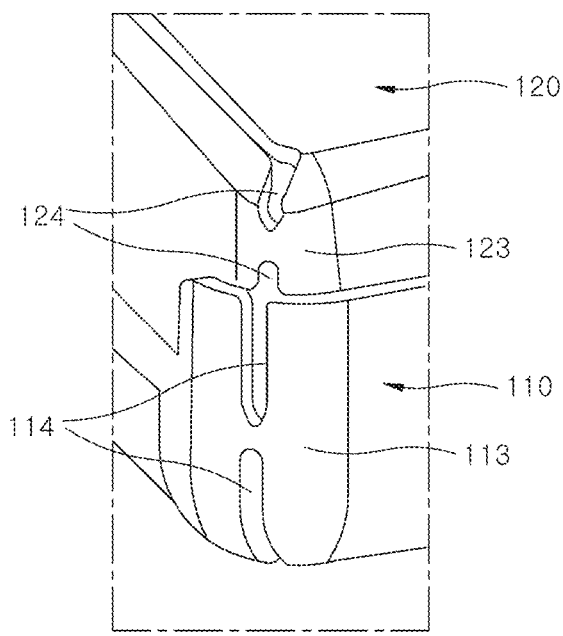
FIG. 7C is a view illustrating the left housing corner on the upper side of the housing in the hard cover for the side airbag in accordance with the embodiment of the present invention.
Figure 7D:
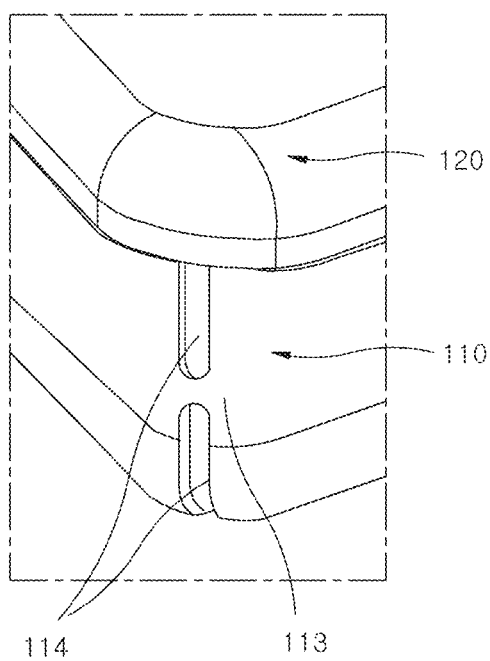
FIG. 7D is a view illustrating the right housing corner on the upper side of the housing in the hard cover for the side airbag in accordance with the embodiment of the present invention.

FIG. 1 is a perspective view illustrating a state in which a hard cover for a side airbag in accordance with an embodiment of the present invention is provided on a side of a slim seat, FIG. 2 is a perspective view illustrating the hard cover for the side airbag in accordance with the embodiment of the present invention, FIG. 3 is a perspective view illustrating a state in which the hard cover for the side airbag in accordance with the embodiment of the present invention is opened, FIG. 4 is a sectional view taken along line A-A that is a width direction of the hard cover for the side airbag in accordance with the embodiment of the present invention, FIG. 5 is an enlarged sectional view illustrating a state in which a first hook unit is restrained by a first restraint unit in the hard cover for the side airbag in accordance with the embodiment of the present invention, FIG. 6A is a view illustrating a coupled state of a second hook unit and a second restraint unit formed on an upper side of a housing in the hard cover for the side airbag in accordance with the embodiment of the present invention, FIG. 6B is a view illustrating a coupled state of the second hook unit and the second restraint unit formed on a lower side of the housing in the hard cover for the side airbag in accordance with the embodiment of the present invention, FIG. 7A is a view illustrating a left housing corner on the lower side of the housing in the hard cover for the side airbag in accordance with the embodiment of the present invention, FIG. 7B is a view illustrating a right housing corner on the lower side of the housing in the hard cover for the side airbag in accordance with the embodiment of the present invention, FIG. 7C is a view illustrating the left housing corner on the upper side of the housing in the hard cover for the side airbag in accordance with the embodiment of the present invention, and FIG. 7D is a view illustrating the right housing corner on the upper side of the housing in the hard cover for the side airbag in accordance with the embodiment of the present invention.

Referring to FIGS. 1 to 7D, a hard cover 100 for a side airbag in accordance with the embodiment of the present invention includes a housing 110, a cover unit 120, a hinge 130, a first restraint unit 140, a first hook unit 150, a second restraint unit 160, and a second hook unit 170.

The hard cover 100 for the side airbag is provided on a side of a slim seat 10. Since the hard cover 100 is provided on the side of the slim seat 10, it is possible to prevent a folded cushion 101 from being inflated as the cushion 101 is pressed by the hard cover 100. Thus, the hard cover 100 may be provided to be flush with the side of the slim seat 10.

The cushion 101 is accommodated in the housing 110. The housing 110 may be formed in the shape of a rectangular box that has an opening formed at one side thereof and is thin in thickness.

The cushion 101 is folded and accommodated in the housing 110. The cushion 101 is connected to an inflator 103.

The cover unit 120 is provided to cover the opening of the housing 110, with a cut part 121 formed thereon to be cut off when the cushion 101 is deployed. The cover unit 120 may be formed in the shape of a rectangular plate. Since the cut part 121 is cut off by the inflation pressure of the cushion 101 when the cushion 101 is deployed, loads acting on the cover unit 120 and the housing 110 can be reduced.

The cut part 121 includes at least one cutoff line 121a that is formed on a front of the cover unit 120. In this case, the cutoff line 121a is formed on the front of the cover unit 120 in a longitudinal (vertical) direction of the cover unit 120. The cutoff line 121a is formed to have a length that is substantially equal to that of the cover unit 120. If the inflation pressure of the cushion 101 is applied to the cover unit 120, the cutoff line 121a is torn prior to other portion of the cover unit 120.

The hinge 130 connects the cover unit 120 and the rear of the housing 110 so that the cover unit 120 is opened while being rotated. The hinge 130 prevents the cover unit 120 from being separated from the housing 110. The hinge 130 is formed in thickness to be thinner than the housing 110 and the cover unit 120.

The first restraint unit 140 is formed on the front of the housing 110. The first restraint unit 140 includes a first restraint rib 141 that is disposed on the front of the housing 110 in a longitudinal direction thereof and has a plurality of first restraint grooves 142 formed to allow the first hook unit 150 to be caught and restrained. The first restraint rib 141 is formed in the shape of an elongated strip, and is connected with the front by a plurality of first partitioning pieces 143. The first restraint grooves 142 are formed between the plurality of first partitioning pieces 143.

The first hook unit 150 is formed on the front of the cover unit 120 to be caught and restrained by the first restraint unit 140. The first hook unit 150 includes a plurality of first hooks 151 that are provided on the front of the cover unit 120 to be inserted into the first restraint grooves 142, respectively. Since the plurality of first hooks 151 are inserted into the corresponding first restraint grooves 142 to be caught by the first restraint rib 141, the front of the cover unit 120 is restrained by the front of the housing 110.

The second restraint units 160 are formed on the upper and lower sides of the housing 110, respectively. Each second restraint unit 160 includes a second restraint rib 161 and a second notch 163. The second restraint ribs 161 are disposed on both sides (upper and lower sides) of the housing 110 in the longitudinal direction thereof, respectively. A second restraint groove 162 is formed on the second restraint rib 161 to allow the second hook 170 to be caught and restrained. The second notch 163 is formed on the second restraint rib 161 to be broken by the pressing force of the second hook unit 170 when the cushion 101 is deployed. Since the second notch 163 is formed on the second restraint rib 161, the pressing force of the second hook unit 170 concentrates on the second notch 163 when the cushion 101 is deployed. Thus, since the second notch 163 is cut prior to the other portions of the second restraint rib 161, the second hook unit 170 may be easily separated from the second restraint rib 161.

FIG. 6A illustrates the second restraint unit 160 and the second hook unit 170 disposed on the upper side of the housing 110. FIG. 6B illustrates the second restraint unit 160 and the second hook unit 170 disposed on the lower side of the housing 110.

The second hook units 170 are provided on both sides (upper and lower sides) of the cover unit 120 in a longitudinal direction thereof, respectively, to be caught and restrained by the second restraint units 160. When the cushion 101 is deployed, the second hook unit 170 is separated from the second restraint unit 160 as the second hook unit 170 is pressed. Since the second hook unit 170 is separated from the second restraint unit 160 when the cushion 101 is deployed, loads acting on the cover unit 120 and the housing 110 can be reduced. Furthermore, since the cut part 121 of the cover unit 120 is cut off when the cushion 101 is deployed and the second hook unit 170 is separated from the second restraint unit 160, the cover unit 120 is opened while being rotated around the hinge 130.

FIG. 7A illustrates the left housing corner on the lower side of the housing. FIG. 7B illustrates the right housing corner on the lower side of the housing, FIG. 7C illustrates the left housing corner on the upper side of the housing, and FIG. 7D illustrates the right housing corner on the upper side of the housing.

At least one housing slit 114 is formed in the housing 110 so that the housing 110 is broken by the inflation pressure of the cushion 101. For example, the housing slit 114 is formed in a housing corner 113 of the housing 110. The housing slit 114 is formed in each of the plurality of housing corners 113. The housing slit 114 may be formed in the periphery of the housing 110 as well as the housing corners 113. The housing slit 114 may be formed to be parallel to the thickness direction of the housing 110. Since the housing slit 114 is formed in the housing corner 113, the rigidity of the housing corner 113 is relatively lower than that of the other portions. Therefore, the housing corner 113 may be easily broken by the housing slit 114.

At least one cover slit 124 is formed in the cover unit 120 so that the cover unit 120 is broken by the inflation pressure of the cushion 101. For example, the cover slit 124 is formed in a cover corner 123 of the cover unit 120. The cover slit 124 may be formed in each of the plurality of cover corners 123. Furthermore, the cover slit 124 may be formed in the periphery of the cover unit 120 as well as the plurality of cover corners 123. In this case, the cover slit 124 is formed to be parallel to the thickness direction of the cover unit 120. Since the cover slit 124 is formed in the cover corner 123, the rigidity of the cover corner 123 is relatively lower than that of the other portions. Therefore, the cover corner 123 may be easily broken by the cover slit 124.

An operation of the hard cover for the side airbag in accordance with the embodiment of the present invention constructed as such will be described.

Figure 8A:
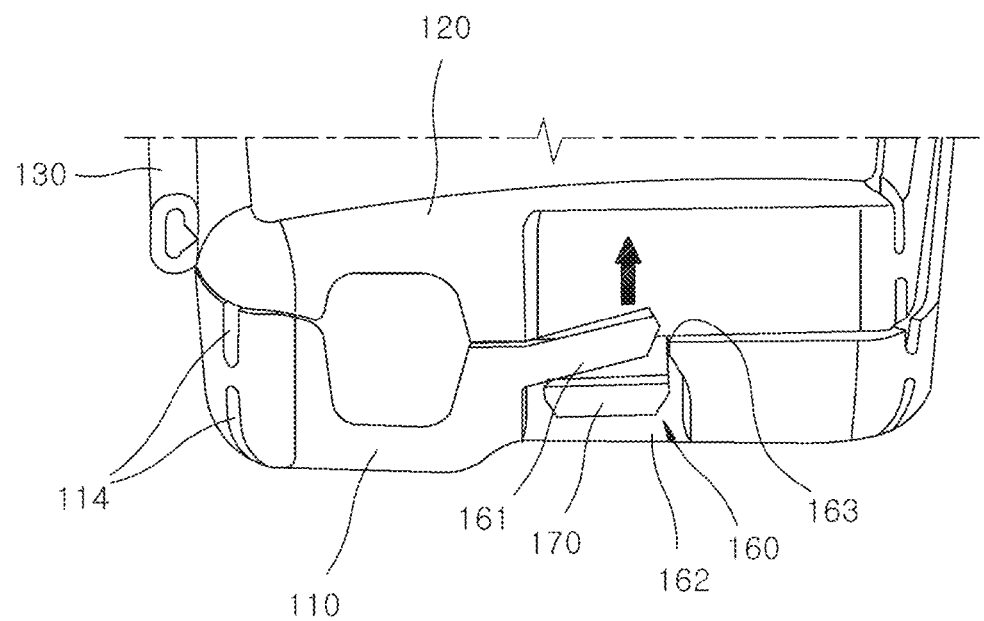
FIG. 8A is a view illustrating a state in which the second restraint unit on the upper side of the housing is broken when a cushion is deployed, in the hard cover for the side airbag in accordance with the embodiment of the present invention.
Figure 8B:
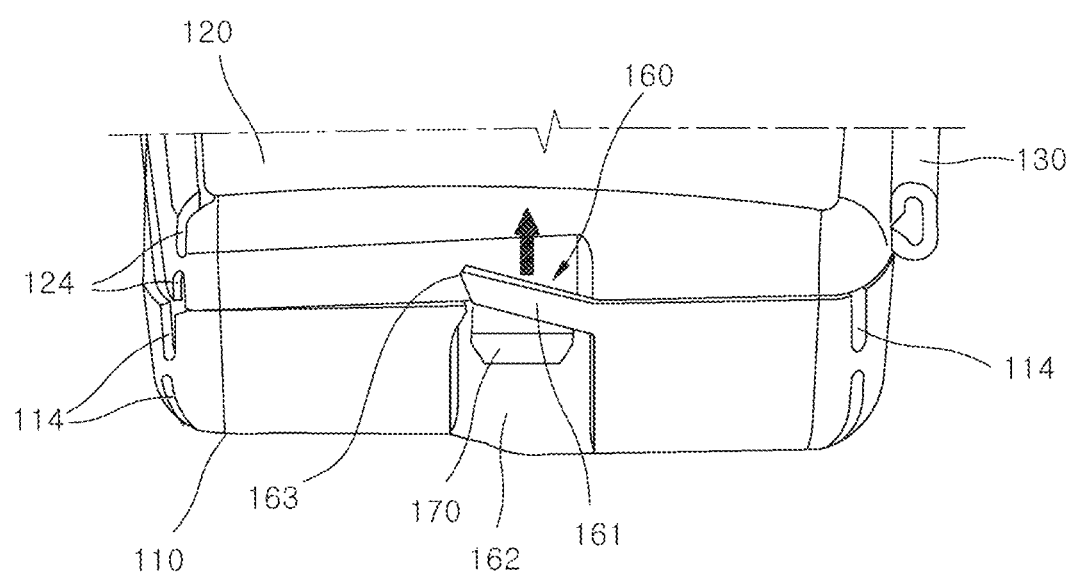
FIG. 8B is a view illustrating a state in which the second restraint unit on the lower side of the housing is broken when the cushion is deployed, in the hard cover for the side airbag in accordance with the embodiment of the present invention.
Figure 9:
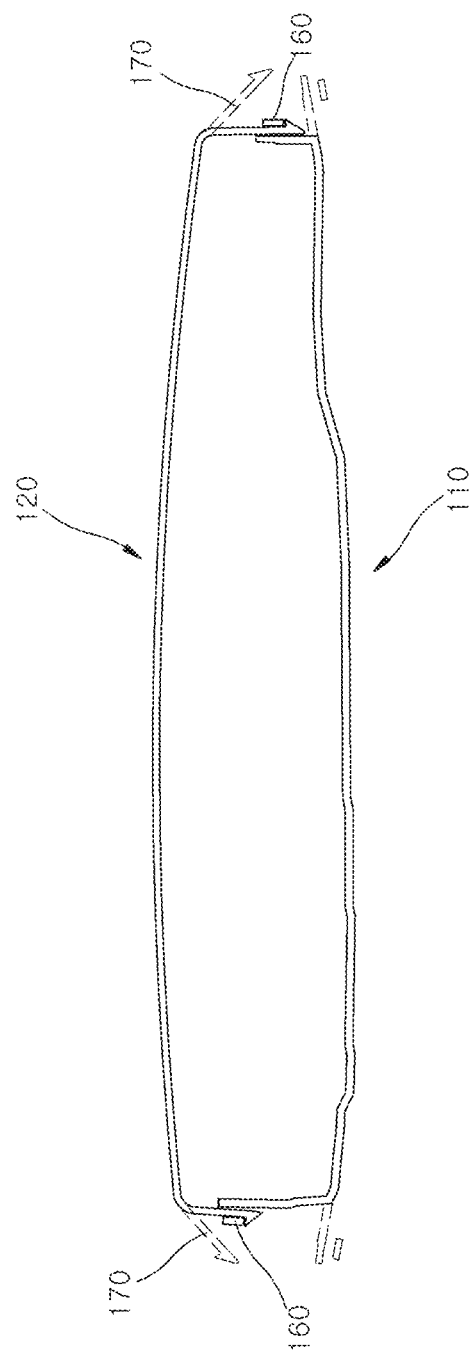
FIG. 9 is a view illustrating a state in which the second hook unit is separated from the second restraint unit when the cushion is deployed, in the hard cover for the side airbag in accordance with the embodiment of the present invention.
Figure 10A:
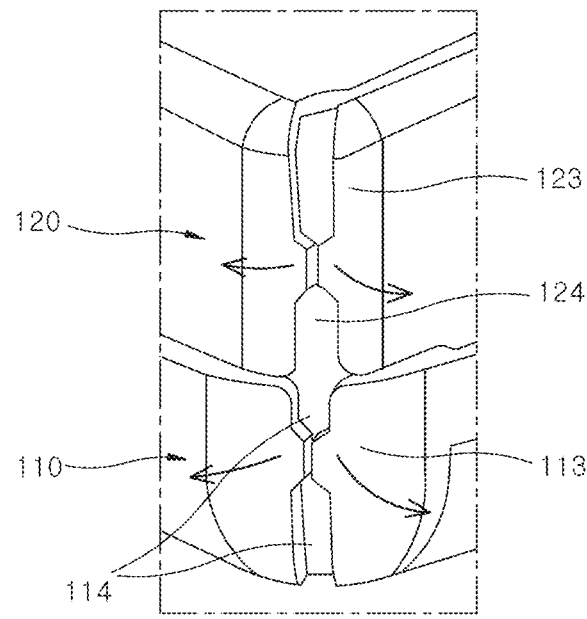
FIG. 10A is an enlarged view illustrating a state in which the left housing corner and a left cover corner on the lower side of the housing are broken when the cushion is deployed, in the hard cover for the side airbag in accordance with the embodiment of the present invention.
Figure 10B:
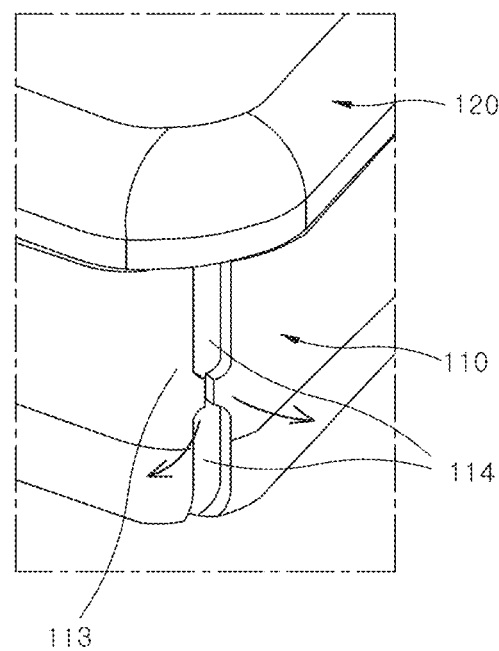
FIG. 10B is an enlarged view illustrating a state in which the right housing corner and a right cover corner on the lower side of the housing are broken when the cushion is deployed, in the hard cover for the side airbag in accordance with the embodiment of the present invention.
Figure 10C:
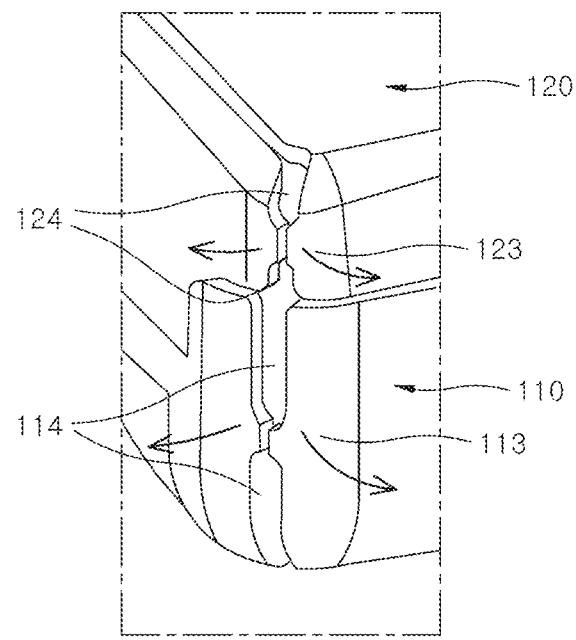
FIG. 10C is an enlarged view illustrating a state in which the left housing corner and cover corner on the upper side of the housing are broken when the cushion is deployed, in the hard cover for the side airbag in accordance with the embodiment of the present invention.
Figure 10D:
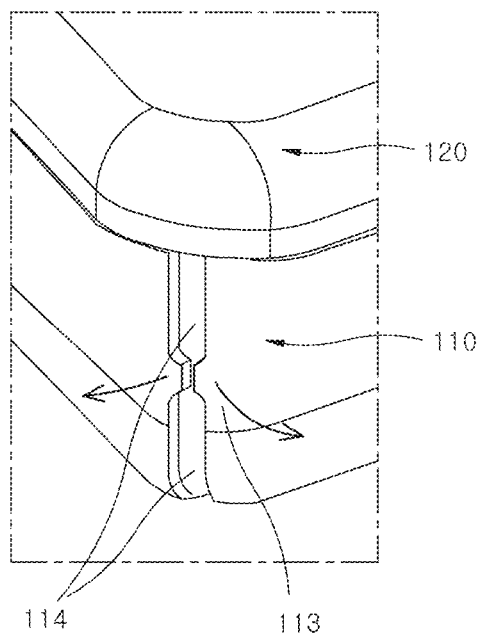
FIG. 10D is an enlarged view illustrating a state in which the right housing corner and cover corner on the upper side of the housing are broken when the cushion is deployed, in the hard cover for the side airbag in accordance with the embodiment of the present invention.
Figure 11:
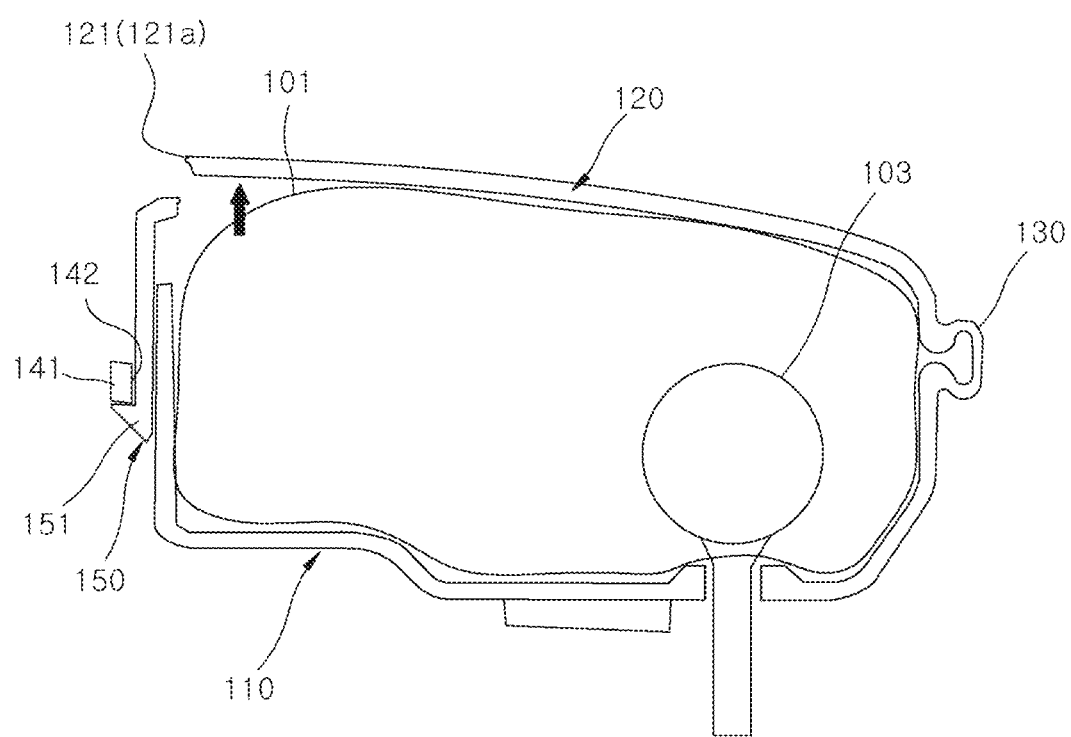
FIG. 11 is a view illustrating a state in which a cut part of a cover unit is cut off from the hard cover for the side airbag in accordance with the embodiment of the present invention.
Figure 12:
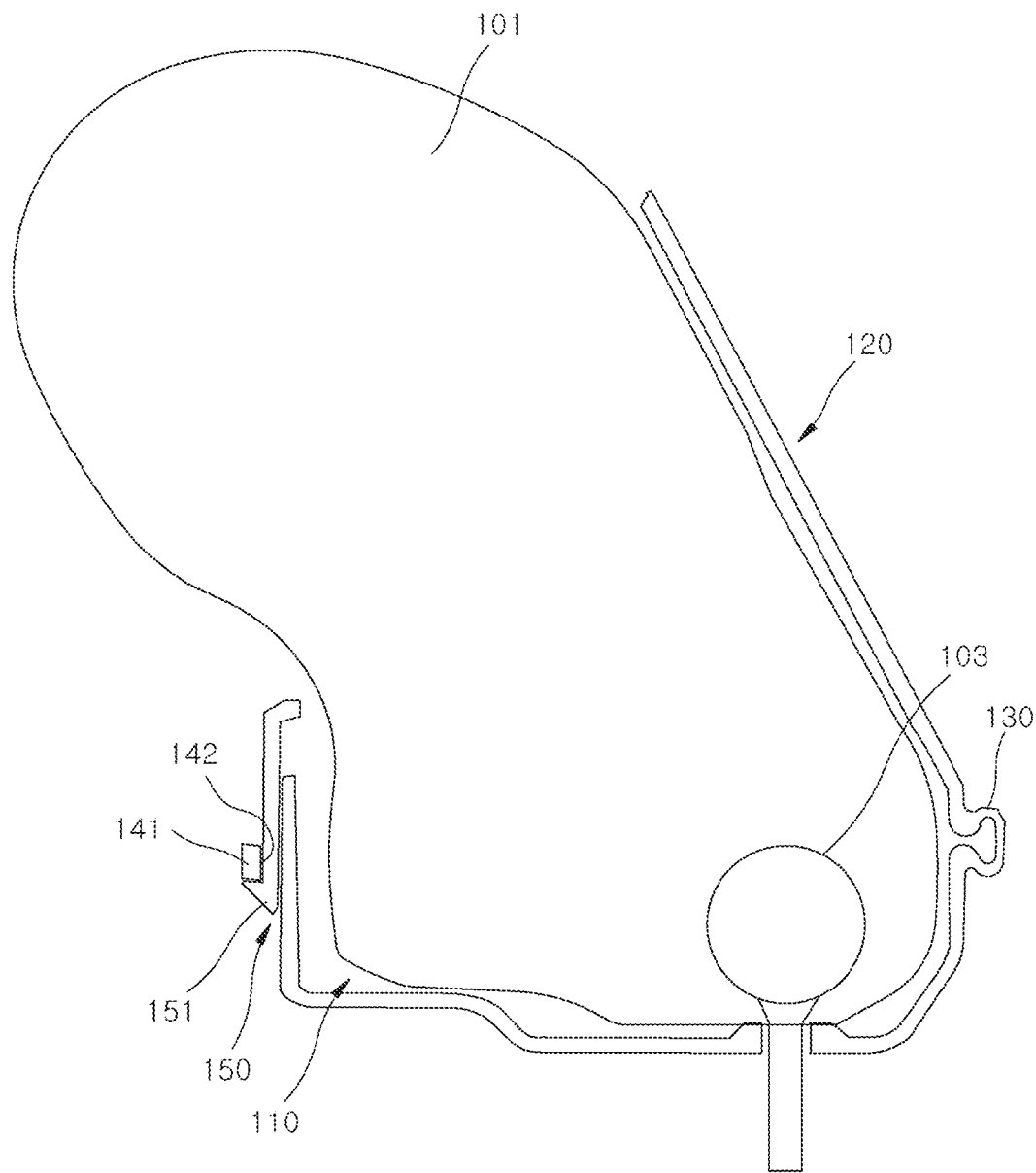
FIG. 12 is a view illustrating a state in which the cushion is deployed in the hard cover for the side airbag in accordance with the embodiment of the present invention.

FIG. 8A is a view illustrating a state in which the second restraint unit on the upper side of the housing is broken when the cushion is deployed, in the hard cover for the side airbag in accordance with the embodiment of the present invention, FIG. 8B is a view illustrating a state in which the second restraint unit on the lower side of the housing is broken when the cushion is deployed, in the hard cover for the side airbag in accordance with the embodiment of the present invention, FIG. 9 is a view illustrating a state in which the second hook unit is separated from the second restraint unit when the cushion is deployed, in the hard cover for the side airbag in accordance with the embodiment of the present invention, FIG. 10A is an enlarged view illustrating a state in which the left housing corner and cover corner on the lower side of the housing are broken when the cushion is deployed, in the hard cover for the side airbag in accordance with the embodiment of the present invention, FIG. 10B is an enlarged view illustrating a state in which the right housing corner and cover corner on the lower side of the housing are broken when the cushion is deployed, in the hard cover for the side airbag in accordance with the embodiment of the present invention, FIG. 10C is an enlarged view illustrating a state in which the left housing corner and cover corner on the upper side of the housing are broken when the cushion is deployed, in the hard cover for the side airbag in accordance with the embodiment of the present invention, FIG. 10D is an enlarged view illustrating a state in which the right housing corner and cover corner on the upper side of the housing are broken when the cushion is deployed, in the hard cover for the side airbag in accordance with the embodiment of the present invention, FIG. 11 is a view illustrating a state in which the cut part of the cover unit is cut off from the hard cover for the side airbag in accordance with the embodiment of the present invention; and FIG. 12 is a view illustrating a state in which the cushion is deployed in the hard cover for the side airbag in accordance with the embodiment of the present invention.

Referring to FIGS. 8A to 12, gas generated from the inflator 103 is injected into the cushion 101 in the event of a vehicle collision. As the cushion 101 is inflated, the inflation pressure of the cushion 101 is applied to the housing 110 and the cover unit 120. The cover unit 120 and the housing 110 are convexly inflated by the inflation pressure, and the peripheries of the cover unit 120 and the housing 110 are inflated outwards.

As the cover unit 120 is pressed towards the opposite side of the housing 110, the second hook unit 170 presses the second restraint rib 161 of the second restraint unit 160 In this case, since the pressure acting on the second restraint rib 161 concentrates on the second notch 163, the second notch 163 is broken. As the second notch 163 is broken, the second hook unit 170 comes out of the second restraint rib 161.

Furthermore, pressure is applied to the housing corners 113 and the cover corners 123. In this case, as the housing corner 113 is spread to both sides of the housing slit 114, the housing corner 113 is broken. Meanwhile, as the cover corner 123 is spread to both sides of the cover slit 124, the cover corner 123 is broken.

Furthermore, as the cover unit 120 is inflated, the cut part 121 is cut off, and the cover unit 120 from which the cut part 121 has been cut off is opened while being rotated around the hinge 130. In this case, since the second hook unit 170 is separated from the second restraint unit 160 and the housing corners 113 and the cover corners 123 are broken, the pressure applied to the cover unit 120 concentrates on the cut part 121. Therefore, since it is possible to prevent the cover unit 120 and the housing 110 from being damaged, it is possible to prevent the deployment direction of the cushion 101 from being changed or to prevent the defective deployment of the cushion 101 from occurring.

Since the first hook unit 150 is restrained by the first restraint unit 140, a cut piece (not illustrated) located in front of the cut part 121 remains in the housing 110. The cushion 101 is deployed while pushing and rotating the cover unit 120. As the cushion 101 is deployed, one side of the slim seat 10 is covered, so that the side of a passenger can be protected.

While the present invention has been described with reference to the specific embodiment illustrated in the attached drawings, this is only for illustrative purposes, and those skilled in the art will understand that various modifications and other equivalent embodiments may be made therefrom.

Therefore, the true spirit and scope of the present invention must be defined by the accompanying claims.

What is claimed is:

1. A hard cover for a side airbag, comprising:
    a housing configured to accommodate a cushion therein;
    a cover unit configured to cover an opening of the housing, and having a cut part formed to be cut when the cushion is deployed, wherein the cover unit comprises at least one cover slit formed to allow the cover unit to be broken by an inflation pressure of the cushion;
    a hinge configured to connect the cover unit and a rear of the housing so that the cover unit is opened while being rotated;
    a first restraint unit provided on a front of the housing;
    a first hook unit provided on a front of the cover unit to be caught and restrained by the first restraint unit;
    a second restraint unit provided on each of upper and lower sides of the housing; and
    a second hook unit provided on each of upper and lower sides of the cover unit to be caught and restrained by the second restraint unit, and separated from the second restraint unit as the cover unit is pressed when the cushion is deployed.

2. The hard cover of claim 1, wherein the cut part comprises at least one cutoff line formed on the front of the cover unit.

3. The hard cover of claim 2, wherein the cutoff line is formed on the front of the cover unit in a longitudinal direction of the cover unit.

4. The hard cover of claim 1, wherein the first restraint unit comprises a first restraint rib disposed on the front of the housing in the longitudinal direction thereof and having a plurality of first restraint grooves formed to allow the first hook unit to be caught and restrained.

5. The hard cover of claim 4, wherein the first hook unit comprises a plurality of first hooks that are provided on the front of the cover unit to be inserted into the first restraint grooves, respectively.

6. The hard cover of claim 1, wherein the second restraint unit comprises:
    a second restraint rib disposed on each of the upper and lower sides of the housing, and having a second restraint groove formed to allow the second hook unit to be caught and restrained; and
    a notch formed in the second restraint rib to be broken by a pressing force of the second hook unit when the cushion is deployed.

7. The hard cover of claim 1, wherein the cover slit is formed in a cover corner of the cover unit.

8. The hard cover of claim 1, wherein the cover slit is formed in each of a plurality of cover corners.

9. The hard cover of claim 1, wherein the housing comprises at least one housing slit formed to allow the housing to be broken by the inflation pressure of the cushion.

10. The hard cover of claim 9, wherein the housing slit is formed in a housing corner of the housing.

11. The hard cover of claim 10, wherein the housing slit is formed in each of a plurality of housing corners.

* * * * *